Patented Sept. 2, 1947

2,426,761

UNITED STATES PATENT OFFICE 2,426,761

PREPARATION OF SILVER CATALYSTS

Adrien Cambron and Francis Leslie William McKim, Ottawa, Ontario, Canada, assignors to The Honorary Advisory Council for Scientific and Industrial Research, Ottawa, Ontario, Canada, a corporation of the Dominion of Canada No Drawing. Original application August 28, 1943, Serial No. 500,360. Divided and this application September 28, 1944, Serial No. 556,280

5 Claims. (Cl. 252—258)

This invention relates to silver catalysts and a method of preparing the same, such catalyst being particularly well adapted for the production of ethylene oxide as disclosed in application Serial No. 500,360 of which this application is a division.

It is well known that two main reactions occur when an olefin, such as ethylene, is subjected to direct catalytic oxidation in the presence of the heretofore known promoted and/or unpromoted catalysts, usually containing silver. In one of these reactions, the ethylene is converted to ethylene oxide in accordance with the following equation:

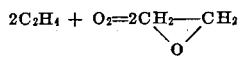

while in the other, the ethylene is oxidized completely to carbon dioxide and water as follows:

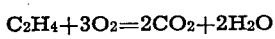

Aside from the fact that the formation of carbon dioxide and water in the catalytic oxidation of ethylene affects the efficiency of the process in that it lowers the potential yield of the desired product, viz. ethylene oxide, the production of carbon dioxide is also undesirable because the heat evolved during such conversion of ethylene to carbon dioxide and water is considerably greater than that evolved during the oxidation of the ethylene to ethylene oxide. As a matter of fact, the heat of reaction evolved in the first of the above-mentioned reactions, i. e. during the oxidation of ethylene to ethylene oxide, is between about ten and eleven times less than that evolved when ethylene is completely oxidized to carbon dioxide and water. Obviously, such excessive evolution of heat is undesirable since it renders the control of the reaction temperature increasingly difficult, if not impossible. On the other hand, in order to obtain economic production of the desired product, the reaction temperature must be carefully controlled within a certain, and generally relatively narrow, range because any local overheating of the catalyst not only results in still greater production of carbon dioxide, but also may, and usually will, adversely affect the activity of the commonly known silver or silver-containing catalysts heretofore proposed for the aforesaid catalytic oxidation reaction.

Numerous methods and means have been previously proposed in an attempt to control the catalytic oxidation of olefins and to obtain higher yields of the desired olefin oxides while, at the same time, inhibiting the formation of undesirable by-products, such as carbon dioxide and water. However, most if not all of these methods and means are attended with certain defects and/or disadvantages.

For example, it has previously been proposed to add water and/or carbon dioxide, as well as hydrogen, to the ethylene which is to be converted to ethylene oxide by subjecting the ethylene to the action of oxygen in the presence of a silver-containing catalyst. Clearly, the use of these gases increases materially the initial and operating costs, since it requires proportionately greater installations to produce a given amount of ethylene oxide per unit of time, and also necessitates additional equipment for the separation of the ethylene oxide from the reaction products and from these additives.

In order to avoid, or at least materially decrease, the conversion of the ethylene to carbon dioxide, it has also been previously suggested to employ specially prepared catalysts and to use various volatile materials which would affect the activity of these specially prepared silver catalysts. In fact it has been proposed to employ tetra-ethyl lead as an addition agent which will inhibit or decrease the formation of the aforementioned by-products of the type of carbon dioxide. Manifestly, the use of substantial proportions of such anti-catalysts or inhibitors complicates the oxidation process, and also increases the ultimate cost of production of the desired olefin oxide.

It is an object of the present invention to provide novel catalysts the use of which in the catalytic oxidation of ethylene will avoid the above and other defects and difficulties of the prior art. Another object of the invention is to provide a method for the efficient and economic production of such catalysts. Still another object is to provide special heat-dissipating carriers on which said catalysts may be disposed, as well as a method for the disposition of said catalysts on such carrier. More specifically stated, one of the objects of the present invention is to provide a novel, rugged and readily producible and reproducible catalyst which, when employed as the catalyst for the direct catalytic oxidation of ethylene, will permit the obtainment of high yields of the desired oxide, will inhibit the formation of by-products, e. g. carbon dioxide, and at the same time will eliminate the necessity of employing any water, carbon dioxide, hydrogen or other anti-oxidants or inhibitors, the use of which has been considered essential when pure ethylene was to be catalytically oxidized to ethylene oxide.

Still another defect of the prior art methods and catalysts proposed for the catalytic oxidations of the character outlined herein resides in the fact that it has been found impossible to employ them for the treatment of hydrocarbon mixtures, which besides the ethylene, also contain even relatively minor amounts of the corresponding or like paraffins. For instance, it has not been found economically feasible or even possible to produce ethylene oxide by oxidizing hydrocarbon fractions comprising or consisting of methane, ethane and ethylene by means of catalysts and methods heretofore proposed for the catalytic oxidation of pure olefins, such as ethylene. Although there is no intention of being limited to any theory, it is believed that this impossibility is due to the rapid deactivation of the heretofore known catalysts at the temperatures which are developed when paraffin- and olefin-containing hydrocarbon mixtures, and specifically mixtures of methane, ethane and ethylene, are subjected to direct catalytic oxidation by known processes and by the use of the known and heretofore proposed catalysts. It is therefore a still further object of the invention to provide a novel and efficient method of treating such hydrocarbon mixtures for the production of high yields of the desired oxide, e. g. ethylene oxide. It is obvious that the provision of a process whereby hydrocarbon mixtures (such as those produced by fractionation of stabilizer gases obtained during the stabilization of gasoline fractions, and particularly of that fraction which consists of or predominates in methane, ethane and ethylene) may be employed as a starting material, greatly decreases the cost of producing ethylene oxide since it eliminates the necessity of providing costly and time-consuming methods for the isolation of the ethylene from such gases.

The preparation of silver catalysts by the thermal decomposition of organic silver compounds, such as silver oxalate, as previously proposed entails considerable hazard primarily because such decomposition reaction takes place explosively. A further object of this invention is therefore to provide a novel process whereby the thermal decomposition of such silver compounds may be effected under controlled conditions, smoothly and without danger of causing explosions.

It has now been discovered that an active, finely divided silver-containing catalyst may be formed without such hazard by effecting decomposition of the oxalate in liquid water and under superatmospheric pressure in the presence of steam and preferably of an inert gas such as carbon dioxide. It has also been discovered that the presence of calcium carbonate and/or calcium oxalate, as well as of stannous oxide, or cadmium oxide renders the decomposed silver oxalate a particularly effective catalyst in the oxidation of ethylene. Although cadmium oxide is quite active as a promoter its use is not as advantageous as stannous oxide due to partial reduction of the oxide under reaction conditions and the formation of a low-melting cadmium silver alloy. It may be that the activity of the catalyst is influenced by a very minute amount of calcium oxide derived from the calcium compounds therein during use of the catalyst. It is significant to note that the oxides of cadmium and calcium crystallize in the cubic system and have substantially the same lattice dimension as silver oxide. The c-dimension of the tetragonal unit cell of tin oxide is also close to that of the edge dimension of the face-centred cubic cell of silver oxide. It was still further discovered that the presence of the aforementioned calcium carbonate and/or calcium oxalate, particularly when stannous or cadmium oxide is also present in the mixture, results in a catalyst which is rugged, stable and resistant to sintering. These catalysts are very active, possess a very high selectivity for the oxidation of ethylene to ethylene oxide, and do not require the addition of any anti-oxidants or inhibitors such as polyhalogenated hydrocarbons, when pure ethylene is subjected to the catalytic treatment with oxygen to produce ethylene oxide.

The calcium compound or compounds may be incorporated into the silver catalyst in any known or suitable manner. Since silver oxalate may be readily and effectively precipitated, for instance, by the addition of a solution of a suitable oxalate, such as sodium oxalate to a solution of a silver nitrate, the incorporation of the calcium oxalate may be effected at this point by addition of the desired or optimum amount of an aqueous solution of calcium nitrate $$(Ca(NO_3)_2.4H_2O)$$

to the silver nitrate solution prior to the addition or mixing of the latter with the sodium oxalate. In this manner it is possible to obtain a precipitate consisting of silver oxalate and calcium oxalate, which mixture may then be thermally treated in accordance with one phase of the invention, in liquid water under a superatmospheric pressure and preferably in an atmosphere of an inert gas, to produce safely, effectively and economically a composition which may be readily used as a catalyst for the oxidation of ethylene to ethylene oxide. In this connection it must be noted that this catalyst, particularly when it contains minor but effective amounts of stannous or cadmium oxide, and when it is disposed on the carriers described in detail hereinbelow, is highly selective as far as the oxidation of ethylene to ethylene oxide is concerned. Also, when the above catalysts are employed for the catalytic oxidation of pure ethylene, there is no need for using any anti-oxidants or inhibitors, such as the volatile halogenated hydrocarbons, since only small amounts of carbon dioxide are formed. This feature alone distinguishes the present procedure from those of the prior art. It is indicated in the art that the catalysts produced and employed heretofore for the catalytic oxidation of pure ethylene always caused the formation of large amounts of carbon dioxide and water unless inhibitors of the type mentioned above are employed therewith. Contrary to the mentioned prior art teachings, when pure ethylene is oxidized with the above-defined novel catalysts, the addition of even very small amounts of halogenated hydrocarbon anti-oxidants is detrimental since it completely destroys or deactivates the novel catalysts in a very short time.

It has been shown above that the thermal decomposition of the silver oxalate or of the precipitate consisting of silver oxalate and calcium oxalate should be effected in water under superatmospheric pressure, preferably in an atmosphere of an inert gas, e. g. carbon dioxide, nitrogen or the like, and at a temperature above the decomposition temperature of the silver oxalate.

Although any superatmospheric pressure may be employed, it has been found that excellent results, i. e. a safe and smooth decomposition of the silver oxalate, occur when the pressure lies between about 5 and about 200 atmospheres, this pressure depending in part on the reaction temperature employed as well as the specific silver salt to be decomposed. As will be shown in the example describing a preferred embodiment of this phase of the invention, a pressure reaching about 2500 lbs. per square inch (about 175 kg. per sq. cm.) was highly satisfactory in that the decomposition of the silver oxalate is not explosive and proceeds smoothly throughout the treatment but higher and lower pressures give good results.

The decomposition temperature employed, which in the case of the treatment of silver oxalate is in the neighbourhood of from 140° C. to 300° C., may or may not be sufficient to effect the decomposition of any or all of the calcium oxalate to calcium carbonate. Therefore, depending on the temperature and pressure employed, as well as on the time during which the decomposition is effected, the resulting reaction product, besides the metallic silver (which is in the form of a light gray, finely divided powder), will contain greater or lesser amounts of calcium carbonate, as well as the calcium oxalate remaining unchanged after the mixture has been subjected to the thermal decomposition.

The amount of the calcium nitrate which is to be added to the aqueous silver nitrate solution (prior to the conversion of the latter to the oxalate) may vary within relatively wide limits, and obviously depends on the desired concentration of the calcium oxalate and calcium carbonate in the finely divided silver metal. Generally, this concentration is in the order of only a few percent, e. g. from about 0.5% to about 7.0% although greater or lesser concentrations may also be effective and, in some cases even preferred.

Although a silver catalyst containing calcium carbonate and/or calcium oxalate, and prepared as described above, is highly suitable for the selective oxidation of ethylene to ethyiene oxide, it is advantageous to incorporate stannous oxide or cadmium oxide. Since the catalyst is highly effective when disposed in the form of a relatively thin layer or film on a suitable support or carrier, and particularly a metal support, one method of such application thereof to the support material comprises the formation of a thin paste, slurry or suspension by mixing the above silver catalyst (which contains the calcium compounds) with a suitable normally liquid suspending medium or diluent, such as ethylene glycol or the like, employed in an amount sufficient to attain a suitable or desired consistency, applying this mixture in a thin layer on to the support by flowing, brushing, spraying, dipping, or any other desired method, and then vaporizing the diluent, as by heating, either prior to or subsequent to the assembling of the reactor containing such silver-coated carrier or support. When such a procedure is employed, the stannous oxide may be added to the abovementioned paste or slurry, which may then be homogenized as by very gentle milling, as for example in a lightly loaded rod or ball mill. This breaks up any small aggregates of silver metal which may have been formed during the thermal decomposition of the oxalates. Also, such milling ensures a uniform distribution of the calcium oxalate and/or calcium carbonate (as well as of the stannous or cadmium oxide, if the latter is used) in the silver. Obviously, the stannous or cadmium oxide may be incorporated in the silver catalyst by any other method. The amount of this oxide to be incorporated in the catalyst will generally range from 0.5% to as high as about 10%, although catalysts of the above class containing the stannous oxide in an amount equal to about 2% of the weight of the silver were found to be highly desirable since they were very active and stable, and did not require the use of any halogen-containing inhibitors when used for the oxidation of pure ethylene.

It must be noted that the physical condition of the catalyst of the present invention is a critical factor in its activity, durability and life. This physical condition, in turn, depends to a large degree on the method employed for the preparation of the catalyst. Therefore, in order to provide the novel catalysts described therein, it is essential to effect the preparation thereof substantially as described. Also, the presence of the calcium carbonate and/or calcium oxalate in the final silver catalyst is important in that these compounds impart the above outlined desirable characteristics to the catalyst. While the stannous or cadmium oxide acts primarily as a catalyst promoter, this oxide also influences the physical and catalytic characteristics of the silver catalyst in a manner which is apparently substantially similar to that of the above calcium compounds. Still another advantage of the present novel catalysts resides in the fact that they may be employed in the form of very thin films spread over a suitable support material, and especially on metal supports. For instance, it has been found that very effective results may be attained by spreading less than 0.02 lbs. of a catalyst of the above type over a square foot of the carrier surface. Manifestly, this affects materially the economy of the ethylene oxidation process.

The novel catalysts are readily poisoned by sulphur compounds such as hydrogen sulphide. However, the activity of the catalyst may be readily restored by intermittent use of sulphide-free reactants which should preferably be conveyed through the reaction zone in a direction opposite to that in which the original sulphide-containing feed was conveyed therethrough. Also excessive concentrations of halogenated hydrocarbons, such as ethylene dichloride, will poison the catalyst, which latter may however also be regenerated in the manner set forth above. It has been generally found that catalysts which have been seriously deactivated by poisoning with the above and like catalyst poisons, and then regenerated, will require a somewhat higher reaction temperature for the optimum oxidation of the olefin, such an increase in temperature being in the neighbourhood of from 5° C. to about 10° C.

For illustrative purposes only, reference is made to the following example which typifies the preferred method of preparing the catalytic material.

Approximately 200 grams of silver nitrate and about 3.1 grams of calcium nitrate

[Ca(NO₃)₂.4H₂O]

were dissolved in about 1.5 litres of distilled water. At the same time about 84 grams of sodium oxalate were dissolved in 1.5 litres of distilled water maintained at about 60° C. After filtration, this solution was added with mechanical stirring to the aqueous solution containing the silver nitrate and the calcium nitrate. A reaction occurred which caused the formation of the oxalates of silver and calcium, which latter were allowed to settle. The supernatant liquid was decanted while the precipitate was successively washed three times each with three litres of distilled water, the clear liquid being decanted after each washing. The precipitate was then removed by filtration and was stored in a dark space. It must be noted that the use of ammonium oxalate as a precipitant instead of the sodium oxalate was attempted, but was not found to be so satisfactory.

Approximately 180 grams of the mixed oxalates formed in the manner described above were thoroughly mixed with approximately 160 c. c. of water, thereby forming a paste. This paste was then placed in a silver cylinder and introduced into a 500 c. c. autoclave which was then swept free from air by means of carbon dioxide. After closing, the autoclave temperature was raised to approximately 230° C., in 15 minutes, the pressure within the autoclave at this temperature being equal to about 175 kg. per sq. cm. Then the autoclave was allowed to cool in air for about 45 minutes after which the pressure was released by opening the valve. During the decomposition reaction most of the water remains in the liquid phase which surrounds the particles and prevents local overheating or sintering thereof due to the high latent heat of vaporization of the water. Decomposition begins at about 140° C. at which point the pressure is about 4 atmospheres but it proceeds more rapidly as the temperature rises. The decomposition of the silver oxalate under these conditions is not explosive, but proceeds smoothly. The metallic silver mixed with calcium carbonate and the unchanged calcium oxalate is obtained in this manner in the form of a light gray, finely divided powder.

For the purpose of applying this powder to suitable supports, and particularly to heat dissipating supports as disclosed and claimed in copending application Serial Number 556,279, filed contemporaneously herewith, approximately 100 grams of the powder were mixed with approximately 50 grams of ethylene glycol. Finely ground stannous oxide was then added in an amount equal to about 2% by weight of the silver powder. The mixture was thoroughly milled in a rod mill to break up the small aggregations of silver and to insure uniformity of distribution. The catalyst was thus obtained in the form of a thin paste suitable for application to the support material by any of the methods described heretofore.

We claim:

1. A process for the preparation of silver catalysts which comprises forming an aqueous solution containing a major amount of silver nitrate and a minor amount of calcium nitrate, mixing said solution with an aqueous sodium oxalate solution, thereby effecting the formation and precipitation of a mixture of silver oxalate and calcium oxalate, separating said formed oxalates from the reaction mixture, mixing said oxalates with water to form a slurry, and subjecting said slurry, at a superatmospheric pressure to a temperature of between about 140° C. and about 300° C. for a period of time sufficient to thermally decompose the silver oxalate in the presence of liquid water and to form a catalyst mixture consisting essentially of finely divided metallic silver and a minor amount of a substance of the group consisting of calcium oxalate, calcium carbonate and a mixture of said calcium compounds.

2. In a process for the preparation of silver catalysts wherein a mixture consisting essentially of a major amount of silver oxalate and a minor amount of calcium oxalate is thermally decomposed, the improvement which comprises subjecting said oxalates in the presence of liquid water to a temperature of between about 140° C. and about 300° C. and for a period of time sufficient to thermally decompose the silver oxalate to metallic silver.

3. In a process for the preparation of silver catalysts wherein a mixture consisting essentially of a major amount of silver oxalate and a minor amount of calcium oxalate is thermally decomposed, the improvement which comprises subjecting said oxalates in the presence of liquid water to a temperature of between about 140° C. and about 300° C., at a superatmospheric pressure, in an atmosphere of an inert gas, and for a period of time sufficient to thermally decompose the silver oxalate to metallic silver.

4. A method as defined in claim 1 wherein tin oxide is added to said catalyst mixture.

5. A method as defined in claim 1 wherein cadmium oxide is added to said catalyst mixture.

ADRIEN CAMBRON.
FRANCIS LESLIE WILLIAM McKIM.

REFERENCES CITED

The following references are of record in the file of this patent:

UNITED STATES PATENTS

| Number | Name | Date |
|---|---|---|
| 2,337,421 | Spence | Dec. 21, 1943 |
| 2,249,367 | Visser | July 15, 1941 |
| 2,040,782 | Van Peski | May 12, 1936 |
| 2,307,421 | Overhoff | Jan. 5, 1943 |
| 2,178,454 | Metzger et al. | Oct. 31, 1939 |
| 1,752,016 | Maximoff | Mar. 25, 1930 |
| 2,164,826 | Lanzwell et al. | July 4, 1939 |